US006805308B2

(12) United States Patent
Kweon et al.

(10) Patent No.: US 6,805,308 B2
(45) **Date of Patent: *Oct. 19, 2004**

(54) LIQUID CRYSTAL DISPENSING APPARATUS HAVING CONTROLLING FUNCTION OF DROPPING AMOUNT CAUSED BY CONTROLLING TENSION OF SPRING

(75) Inventors: Hyug Jin Kweon, Kyoungsangbuk-do (KR); Hae-Joon Son, Pusan (KR)

(73) Assignee: LG. Philips LCD Co., Ltd., Seoul (KR)

( * ) Notice: Subject to any disclaimer, the term of this patent is extended or adjusted under 35 U.S.C. 154(b) by 148 days.

This patent is subject to a terminal disclaimer.

(21) Appl. No.: 10/183,469

(22) Filed: Jun. 28, 2002

(65) Prior Publication Data

US 2003/0160115 A1 Aug. 28, 2003

(30) Foreign Application Priority Data

Feb. 22, 2002 (KR) ....................................... P 2002-9656

(51) Int. Cl.[7] ............................. B05B 1/30; B67D 3/00; B65B 1/04; B65B 3/04; G02F 1/1341

(52) U.S. Cl. ....................... 239/583; 239/569; 222/518; 141/98; 349/189

(58) Field of Search ................................. 239/583, 569; 222/394, 504, 518; 349/189; 427/8; 141/98

(56) References Cited

U.S. PATENT DOCUMENTS

| | | | | |
|---|---|---|---|---|
| 3,978,580 A | | 9/1976 | Leupp et al. | |
| 4,094,058 A | | 6/1978 | Yasutake et al. | |
| 4,653,864 A | | 3/1987 | Baron et al. | |
| 4,691,995 A | | 9/1987 | Yamazaki et al. | |
| 4,775,225 A | | 10/1988 | Tsuboyama et al. | |
| 4,867,198 A | * | 9/1989 | Faust | 137/503 |
| 5,263,888 A | | 11/1993 | Ishihara et al. | |
| 5,277,344 A | * | 1/1994 | Jenkins | 222/504 |
| 5,379,139 A | | 1/1995 | Sato et al. | |
| 5,406,989 A | | 4/1995 | Abe | |
| 5,499,128 A | | 3/1996 | Hasegawa et al. | |
| 5,507,323 A | | 4/1996 | Abe | |
| 5,539,545 A | | 7/1996 | Shimizu et al. | |
| 5,548,429 A | | 8/1996 | Tsujita | |
| 5,680,189 A | | 10/1997 | Shimizu et al. | |
| 5,757,451 A | | 5/1998 | Miyazaki et al. | |
| 5,852,484 A | | 12/1998 | Inoue et al. | |
| 5,854,664 A | | 12/1998 | Inoue et al. | |
| 5,861,932 A | | 1/1999 | Inata et al. | |
| 5,875,922 A | | 3/1999 | Chastine et al. | |
| 5,944,693 A | * | 8/1999 | Jacobs | 604/134 |

(List continued on next page.)

FOREIGN PATENT DOCUMENTS

| | | |
|---|---|---|
| EP | 1003066 A1 | 5/2000 |
| JP | 57038414 | 3/1982 |

(List continued on next page.)

*Primary Examiner*—William C. Doerrler
(74) *Attorney, Agent, or Firm*—McKenna Long & Aldridge LLP

(57) ABSTRACT

A liquid crystal dispensing apparatus for controlling the amount of liquid crystal dropped onto a substrate by controlling the tension of a spring. The spring applies a force to a needle that forces the needle toward an opening on the end of the container so as to close the opening. A tension controller controls that length of the spring, and thus its force. A solenoid moves the needle against the spring when an electric source is applied to the solenoid such that the opening is opened. The spring tension controls the time required to return the needle to a position that closes the opening. The spring tension also controls the amount of liquid crystal that is ejected when the opening is opened.

25 Claims, 8 Drawing Sheets

U.S. PATENT DOCUMENTS

| | | | | |
|---|---|---|---|---|
| 5,952,676 | A | | 9/1999 | Sato |
| 5,956,112 | A | | 9/1999 | Fujimori et al. |
| 6,001,203 | A | | 12/1999 | Yamada et al. |
| 6,016,181 | A | | 1/2000 | Shimada |
| 6,060,125 | A | * | 5/2000 | Fujii .......................... 427/421 |
| 6,219,126 | B1 | | 4/2001 | Von Gutfeld |
| 6,236,445 | B1 | | 5/2001 | Foschaar et al. |
| 6,257,444 | B1 | * | 7/2001 | Everett .......................... 222/1 |
| 6,304,311 | B1 | | 10/2001 | Egami et al. |
| 6,337,730 | B1 | | 1/2002 | Ozaki et al. |
| 6,610,364 | B1 | * | 8/2003 | Kweon et al. .............. 427/256 |
| 2001/0021000 | A1 | | 9/2001 | Egami |
| 2003/0178095 | A1 | * | 9/2003 | Kim et al. .................... 141/98 |

FOREIGN PATENT DOCUMENTS

| | | | |
|---|---|---|---|
| JP | 57088428 | | 6/1982 |
| JP | 58027126 | | 2/1983 |
| JP | 60164723 | | 8/1985 |
| JP | 60217343 | | 10/1985 |
| JP | 61007822 | | 1/1986 |
| JP | 61055625 | | 3/1986 |
| JP | 62089025 | | 4/1987 |
| JP | 62090622 | | 4/1987 |
| JP | 62205319 | | 9/1987 |
| JP | 63109413 | | 5/1988 |
| JP | 63110425 | | 5/1988 |
| JP | 63128315 | | 5/1988 |
| JP | 63311233 | | 12/1988 |
| JP | 05127179 | | 5/1993 |
| JP | 5154923 | | 6/1993 |
| JP | 05265011 | | 10/1993 |
| JP | 05281557 | | 10/1993 |
| JP | 05281562 | | 10/1993 |
| JP | 06051256 | | 2/1994 |
| JP | 06148657 | | 5/1994 |
| JP | 6160871 | | 6/1994 |
| JP | 6235925 | | 8/1994 |
| JP | 06265915 | | 9/1994 |
| JP | 6313870 | | 11/1994 |
| JP | 7084268 | | 3/1995 |
| JP | 07128674 | | 5/1995 |
| JP | 07181507 | | 7/1995 |
| JP | 08095066 | | 4/1996 |
| JP | 8101395 | | 4/1996 |
| JP | 08106101 | | 4/1996 |
| JP | 08171094 | | 7/1996 |
| JP | 08190099 | | 7/1996 |
| JP | 08240807 | | 9/1996 |
| JP | 09005762 | | 1/1997 |
| JP | 09026578 | | 1/1997 |
| JP | 9061829 | | 3/1997 |
| JP | 09073075 | | 3/1997 |
| JP | 09073096 | | 3/1997 |
| JP | 09127528 | | 5/1997 |
| JP | 09230357 | | 9/1997 |
| JP | 09281511 | | 10/1997 |
| JP | 09311340 | | 12/1997 |
| JP | 10123537 | | 5/1998 |
| JP | 10123538 | | 5/1998 |
| JP | 10142616 | | 5/1998 |
| JP | 10177178 | | 6/1998 |
| JP | 10221700 | | 8/1998 |
| JP | 10282512 | | 10/1998 |
| JP | 10333157 | | 12/1998 |
| JP | 10333159 | | 12/1998 |
| JP | 11014953 | | 1/1999 |
| JP | 11038424 | | 2/1999 |
| JP | 11064811 | | 3/1999 |
| JP | 11109388 | | 4/1999 |
| JP | 11133438 | | 5/1999 |
| JP | 11142864 | | 5/1999 |
| JP | 11174477 | | 7/1999 |
| JP | 11212045 | | 8/1999 |
| JP | 11248930 | | 9/1999 |
| JP | 11326922 | | 11/1999 |
| JP | 11344714 | | 12/1999 |
| JP | 2000-002879 | | 1/2000 |
| JP | 2000029035 | | 1/2000 |
| JP | 2000-056311 | | 2/2000 |
| JP | 2000-066165 | | 3/2000 |
| JP | 2000-137235 | | 5/2000 |
| JP | 2000-147528 | | 5/2000 |
| JP | 2000-193988 | | 7/2000 |
| JP | 2000-241824 | | 9/2000 |
| JP | 2000-284295 | | 10/2000 |
| JP | 2000-292799 | | 10/2000 |
| JP | 2000-310759 | | 11/2000 |
| JP | 2000-310784 | | 11/2000 |
| JP | 2000-338501 | | 12/2000 |
| JP | 2001-005401 | | 1/2001 |
| JP | 2001-005405 | | 1/2001 |
| JP | 2001-013506 | | 1/2001 |
| JP | 2001-033793 | | 2/2001 |
| JP | 2001-042341 | | 2/2001 |
| JP | 2001-051284 | | 2/2001 |
| JP | 2001-066615 | | 3/2001 |
| JP | 2001-091727 | | 4/2001 |
| JP | 2001117105 | | 4/2001 |
| JP | 2001-117109 | | 4/2001 |
| JP | 2001-133745 | | 5/2001 |
| JP | 2001133794 | | 5/2001 |
| JP | 2001-133799 | | 5/2001 |
| JP | 2001142074 | | 5/2001 |
| JP | 2001147437 | | 5/2001 |
| JP | 2001154211 | | 6/2001 |
| JP | 2001-166272 | | 6/2001 |
| JP | 2001-166310 | | 6/2001 |
| JP | 2001-183683 | | 7/2001 |
| JP | 2001-209052 | | 8/2001 |
| JP | 2001-209060 | | 8/2001 |
| JP | 2001-222017 | | 8/2001 |
| JP | 2001-235758 | | 8/2001 |
| JP | 2001-215459 | | 9/2001 |
| JP | 2001255542 | | 9/2001 |
| JP | 2001264782 | | 9/2001 |
| JP | 2001-201750 | | 10/2001 |
| JP | 2001-272640 | | 10/2001 |
| JP | 2001-281675 | | 10/2001 |
| JP | 2001-281678 | | 10/2001 |
| JP | 2001-282126 | | 10/2001 |
| JP | 2001-305563 | | 10/2001 |
| JP | 2001-330837 | | 11/2001 |
| JP | 2001330840 | | 11/2001 |
| JP | 2001-356353 | | 12/2001 |
| JP | 2001356354 | | 12/2001 |
| JP | 2002014360 | | 1/2002 |
| JP | 2002023176 | | 1/2002 |
| JP | 2002049045 | | 2/2002 |
| JP | 2002082340 | | 3/2002 |
| JP | 2002090759 | | 3/2002 |
| JP | 2002090760 | | 3/2002 |
| JP | 2002107740 | | 4/2002 |
| JP | 2002122872 | | 4/2002 |
| JP | 2002122873 | | 4/2002 |
| JP | 2002080321 | | 6/2002 |
| JP | 2002202512 | | 7/2002 |
| JP | 2002202514 | | 7/2002 |
| JP | 2002214626 | | 7/2002 |
| KR | 2000-0035302 | A1 | 6/2000 |

* cited by examiner

LIQUID CRYSTAL DISPENSING APPARATUS HAVING CONTROLLING FUNCTION OF DROPPING AMOUNT CAUSED BY CONTROLLING TENSION OF SPRING

This application claims the benefit of Korean Patent Application No. 9656/2002, filed on Feb. 22, 2002, which is hereby incorporated by reference for all purposes as if fully set forth herein.

This application incorporates by reference two co-pending applications, Ser. No 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal dispensing apparatus that dispenses a controlled amount of liquid crystal, with the dispensed amount depending on the tension of a spring.

2. Description of the Related Art

Portable electric devices, such as mobile phones, personal digital assistants (PDA), and notebook computers, often require thin, lightweight, and efficient flat panel displays. There are various types of flat panel displays, including liquid crystal displays (LCD), plasma display panels (PDP), field emission displays (FED), and vacuum fluorescent displays (VFD). Of these, LCDs have the advantages of being widely available, easy to use, and superior image quality.

The LCD displays information based on the refractive anisotropy of liquid crystal. As shown in FIG. 1, an LCD 1 comprises a lower substrate 5, an upper substrate 3, and a liquid crystal layer 7 that is disposed between the lower substrate 5 and the upper substrate 3. The lower substrate 5 includes an array of driving devices and a plurality of pixels (not shown). The individual driving devices are usually thin film transistors (TFT) located at each pixel. The upper substrate 3 includes color filters for producing color. Furthermore, a pixel electrode and a common electrode are respectively formed on the lower substrate 5 and on the upper substrate 3. Alignment layers are formed on the lower substrate 5 and on the upper substrate 3. The alignment layers are used to uniformly align the liquid crystal layer 7.

The lower substrate 5 and the upper substrate 3 are attached using a sealing material 9. In operation, the liquid crystal molecules are initially oriented by the alignment layers, and then reoriented by the driving device according to video information so as to control the light transmitted through the liquid crystal layer to produce an image.

The fabrication of an LCD device requires the forming of driving devices on the lower substrate 5, the forming of color filters on the upper substrate 3, and injecting liquid crystal in a cell process (described subsequently). Those processes will be described with reference to FIG. 2.

Initially, in step S101, a plurality of perpendicularly crossing gate lines and data lines are formed on the lower substrate 5, thereby defining pixel areas between the gate and data lines. A thin film transistor that is connected to a gate line and to a data line is formed in each pixel area. Also, a pixel electrode that is connected to the thin film transistor is formed in each pixel area. This enables driving the liquid crystal layer according to signals applied through the thin film transistor.

In step S104, R (Red), G (Green), and B (Blue) color filter layers (for reproducing color) and a common electrode are formed on the upper substrate 3. Then, in steps S102 and S105, alignment layers are formed on the lower substrate 5 and on the upper substrate 3. The alignment layers are rubbed to induce surface anchoring (establishing a pretilt angle and an alignment direction) for the liquid crystal molecules. Thereafter, in step S103, spacers for maintaining a constant, uniform cell gap is dispersed onto the lower substrate 5.

Then, in steps S106 and S107, a sealing material is applied onto outer portions such that the resulting seal has a liquid crystal injection opening. That opening is used to inject liquid crystal The upper substrate 3 and the lower substrate 5 are then attached together by compressing the sealing material.

While the foregoing has described forming a single panel area, in practice it is economically beneficial to form a plurality of unit panel areas. To this end, the lower substrate 5 and the upper substrate 3 large glass substrates that contain a plurality of unit panel areas, each having a driving device array or a color filter array surrounded by sealant having a liquid crystal injection opening. To isolate the individual unit panels, in step S108 the assembled glass substrates are cut into individual unit panels. Thereafter, in step S109 liquid crystal is injected into the individual unit panels by way of liquid crystal injection openings, which are then sealed. Finally, in step S110 the individual unit panels are tested.

As described above, liquid crystal is injected through a liquid crystal injection opening. Injection of the liquid crystal is usually pressure induced. FIG. 3 shows a device for injecting liquid crystal. As shown, a container 12 that contains liquid crystal, and a plurality of individual unit panels 1 are placed in a vacuum chamber 10 such that the individual unit panels 1 are located above the container 12. The vacuum chamber 10 is connected to a vacuum pump that produces a predetermined vacuum. A liquid crystal display panel moving device (not shown) moves the individual unit panels 1 into contact with the liquid crystal 14 such that each injection opening 16 is in the liquid crystal 14.

When the vacuum within the chamber 10 is increased by inflowing nitrogen gas ($N_2$) the liquid crystal 14 is injected into the individual unit panels 1 through the liquid crystal injection openings 16. After the liquid crystal 14 entirely fills the individual unit panels 1, the liquid crystal injection opening 16 of each individual unit panel 1 is sealed by a sealing material.

While generally successful, there are problems with pressure injecting liquid crystal 14. First, the time required for the liquid crystal 14 to inject into the individual unit panels 1 is rather long. Generally, the gap between the driving device array substrate and the color filter substrate is very narrow, on the order of micrometers. Thus, only a very small amount of liquid crystal 14 is injected into per unit time. For example, it takes about 8 hours to inject liquid crystal 14 into an individual 15 inch unit panel 1. This decreases fabrication efficiency.

Second, liquid crystal 14 consumption is excessive. Only a small amount of liquid crystal 14 in the container 12 is actually injected into the individual unit panels 1. Since liquid crystal 14 exposed to air or to certain other gases can be contaminated by chemical reaction the remaining liquid crystal 14 should be discarded. This increases liquid crystal fabrication costs.

Therefore, an improved method and apparatus of disposing a liquid crystal between substrates would be beneficial.

SUMMARY OF THE INVENTION

Accordingly, the present invention is directed to provide a liquid crystal dispensing apparatus for directly dropping liquid crystal onto a glass substrate that substantially obviates one or more of the problems due to limitations and disadvantages of the related art.

An advantage of the present invention is to provide a liquid crystal dispensing apparatus enables control of the amount of liquid crystal that is dropped onto the substrate using the tension of a spring.

To achieve these and other advantages and in accordance with the purpose of the present invention, as embodied and broadly described herein, there is provided a liquid crystal dispensing apparatus having a liquid crystal container for holding a liquid crystal. The liquid crystal container is inside a case. A needle sheet is disposed on a lower portion of the liquid crystal container. The needle sheet includes an opening through which liquid crystal in the liquid crystal container is discharged. A movable needle is inserted into the liquid crystal container. A spring in a receiving case biases the needle toward the opening such that the opening tends to close. A tension controller connected to the receiving case controls the tension of the spring by controlling the spring length. A solenoid, beneficially with the aid of a bar magnetic, selectively produces a magnetic force that moves the needle away from the opening. A nozzle disposed on a lower portion of the liquid crystal container emits liquid crystal when the opening is open.

The spring is beneficially located between a spring fixer on the needle and an end portion of the tension controller. As the length of the spring is adjusted, the tension applied to the needle is changed. Consequently, after the magnetic force is removed the spring returns the needle so as to close the opening. Beneficially, the time that the opening is opened depends on the spring tension. Furthermore, the amount of liquid crystal that passes through the nozzle depends on the spring tension.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to an embodiment of the present invention, the example of which is shown in the accompanying drawings.

To solve the problems of the conventional liquid crystal injection methods, a novel liquid crystal dropping method has been recently introduced. The liquid crystal dropping method forms a liquid crystal layer by directly applying liquid crystal onto a substrate and then spreading the applied liquid crystal by pressing substrates together. According to the liquid crystal dropping method, the liquid crystal is applied to the substrate in a short time period such that the liquid crystal layer can be formed quickly. In addition, liquid crystal consumption can be reduced due to the direct application of the liquid crystal, thereby reducing fabrication costs.

Figure 1:
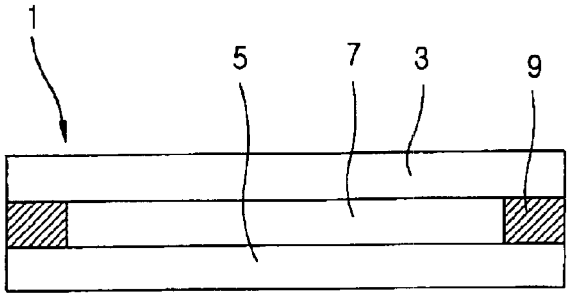
FIG. 1 PRIOR ART
FIG. 1 is a cross-sectional view of an LCD.
Figure 2:
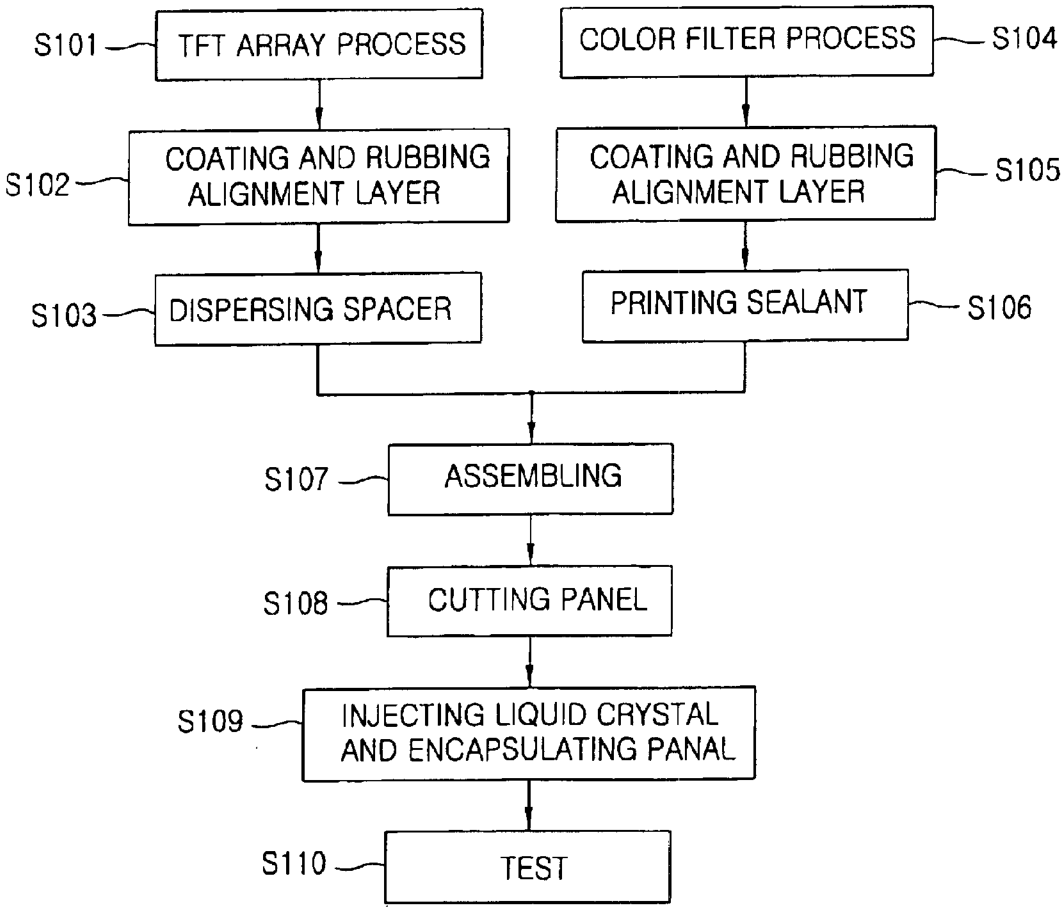
FIG. 2 PRIOR ART
FIG. 2 is a flow chart showing a conventional method of fabricating the LCD of FIG. 1.
Figure 3:
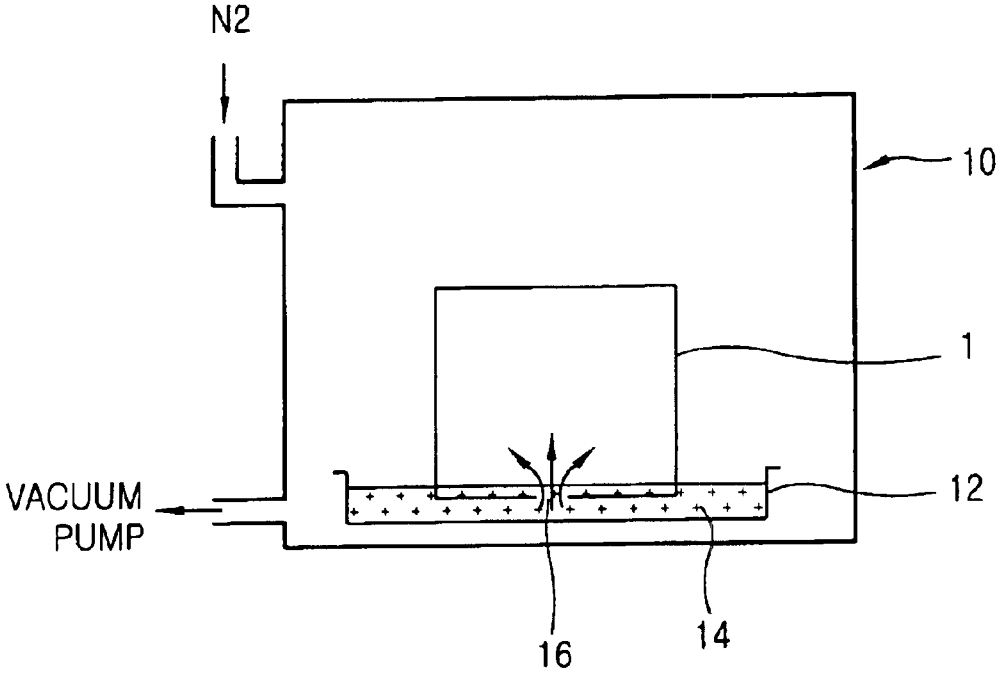
FIG. 3 PRIOR ART
FIG. 3 illustrate a prior art method liquid crystal injection.
Figure 4:
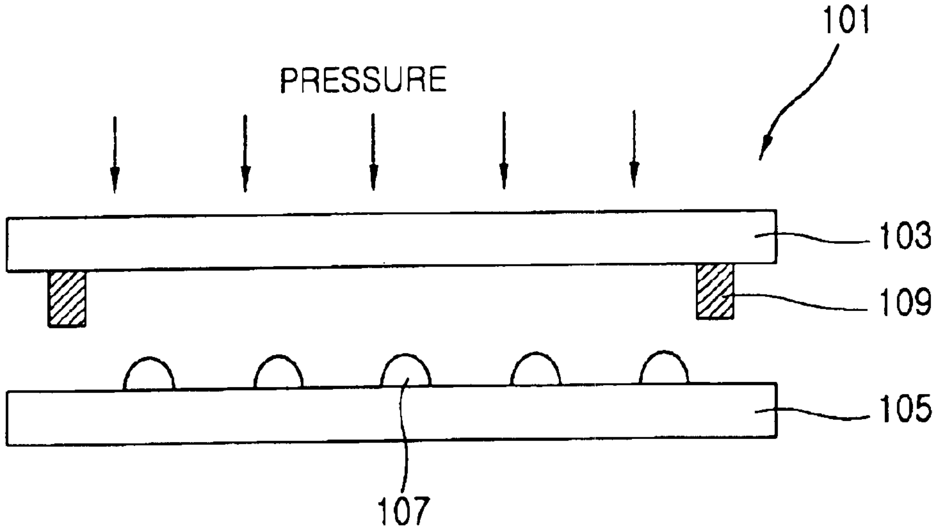
FIG. 4 is a view illustrates a method in which dropped liquid crystal material is used to produce liquid crystal between two substrates.

FIG. 4 illustrates the basic liquid crystal dropping method. As shown, liquid crystal is dropped (applied) directly onto a lower substrate 105 before the lower substrate 105 and the upper substrate 103 are assembled. Alternatively, the liquid crystal 107 may be dropped onto the upper substrate 103. That is, the liquid crystal may be formed either on a TFT (thin film transistor) substrate or on a CF (color filter) substrate. However, the substrate on which the liquid crystal is applied should be the lower substrate during assembly.

A sealing material 109 is applied on an outer part of the upper substrate (substrate 103 in FIG. 4). The upper substrate (103) and the lower substrate (105) are then attached as the upper substrate (103) and the lower substrate (105) are compressed together. At the same time, the liquid crystal drops (107) spread out by the pressure, thereby forming a liquid crystal layer of uniform thickness between the upper substrate 103 and the lower substrate 105.

The method of fabricating LCDs applied by the liquid crystal dispensing method has differences from the conventional liquid crystal injection method. In the conventional liquid crystal injection method, assembled glass substrates having unit panels are divided into the unit panels, which are then injected with liquid crystal. However, in the liquid crystal dropping method, the liquid crystal is applied directly onto a substrate before assembly, the substrates are assembled, and then divided into unit panels. The liquid crystal dropping method has many advantages.

Figure 5:
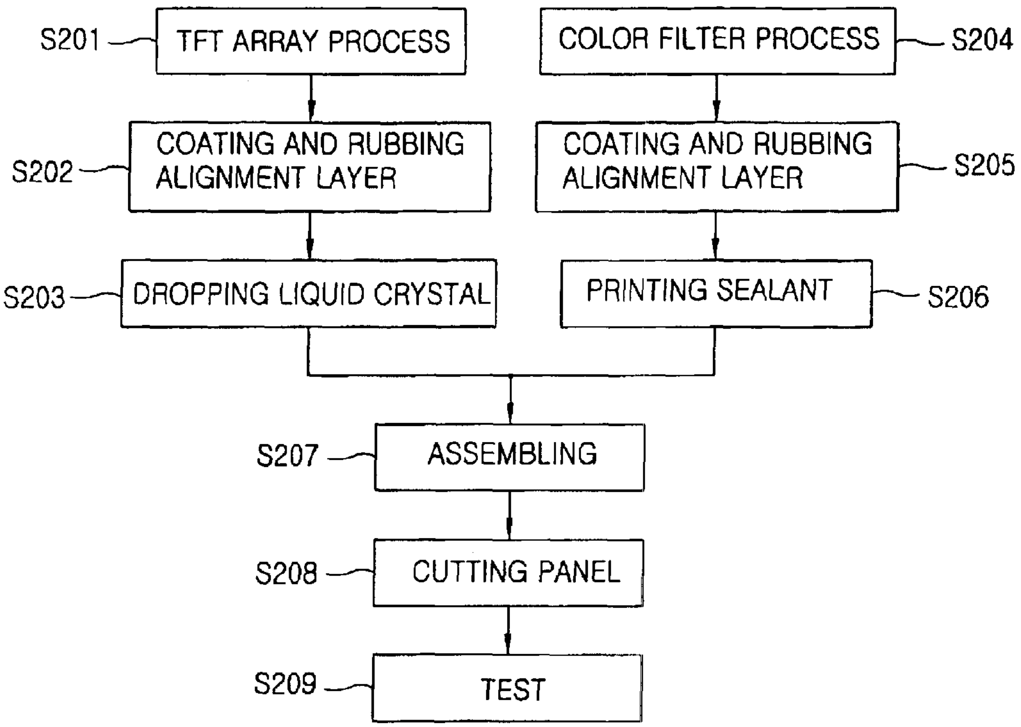
FIG. 5 is a flow chart showing an exemplary method of fabricating LCD according to a liquid crystal dropping method.

FIG. 5 presents a flowchart of a method of fabricating LCDs using the liquid crystal dropping method. As shown, in steps S201 and S202 the TFT array is fabricated and processed, and an alignment layer is formed and rubbed. In steps S204 and S205 a color filter array is fabricated, and processed, and an alignment layer is formed and rubbed. Then, as shown in step S203 liquid crystals are dropped (applied) onto one of the substrates. In FIG. 5, the TFT array substrate is shown as receiving the drops, but the color filter substrate might be preferred in some applications. Additionally, as shown in step S206, a sealant is printed onto one of the substrates, in FIG. 5 the color filter substrate (the TFT array substrate might be preferred in some applications). It should be noted that the TFT array fabrication process and the color filter fabrication process are generally similar to those used in conventional LCD fabrication process. By applying liquid crystals by dropping it directly onto a substrate it is possible to fabricate LCDs using large-area glass substrates (1000×1200 mm2 or more), which is much larger than that possible using conventional fabrication methods.

Thereafter, the upper and lower substrates are disposed facing each other and compressed to attach to each other using the sealing material. This compression causes the dropped liquid crystal to evenly spread out on entire panel. This is performed in step S207. By this process, a plurality of unit liquid crystal panel areas having liquid crystal layers are formed by the assembled glass substrates. Then, in step S208 the glass substrates are processed and cut into a plurality of liquid crystal display unit panels. The resultant individual liquid crystal panels are then inspected, thereby finishing the LCD panel process, reference step S209.

The liquid crystal dropping method is much faster than the conventional liquid crystal injection method. Moreover, the liquid crystal injection method avoids liquid crystal contamination. Finally, the liquid crystal dropping method, once perfected, is simpler than the liquid crystal injection method, thereby enabling improved fabrication efficiency and yield.

In the liquid crystal dropping (application method), the size of the dropped liquid crystal should be carefully controlled. To that end, the present invention provides for an apparatus for dropping an exact amount of liquid crystal.

Figure 6:
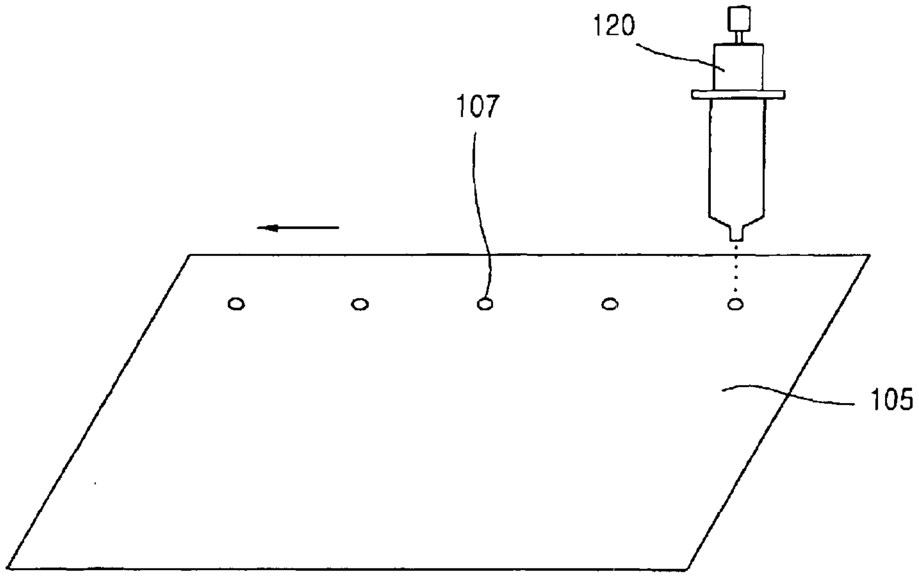
FIG. 6 is a perspective view showing the liquid crystal dropping method.

FIG. 6 is a perspective view showing the dropping of liquid crystal 107 onto the substrate 105 using a liquid crystal dispensing apparatus 120 that is in accord with the principles of the present invention. As shown, the liquid crystal dispensing apparatus 120 is positioned above the substrate 105.

Generally, liquid crystal 107 is dropped onto the substrate 105, which moves in the x and y-directions with a predetermined speed as the liquid crystal dispensing apparatus 120 discharges liquid crystal at a predetermined rate. Therefore, the liquid crystal 107 on the substrate 105 is arranged in the x and y direction with predetermined spaces. Alternatively, the substrate 105 may be fixed, while the liquid crystal dispensing apparatus 120 is moved in the x and y directions. However, since liquid crystal drops on the nozzle of the liquid crystal dispensing apparatus 120 may be disturbed by the movement of the liquid crystal dispensing apparatus 120, the liquid crystal pattern on the substrate might be disturbed. Therefore, it is preferable that the liquid crystal dispensing apparatus 120 is fixed and that the substrate 105 is moved.

To drop exact amounts of liquid crystal onto the substrate the amount of liquid crystal dropping must be accurately controlled. Conventional liquid crystal dispensing apparatus control the dropping amounts using air pressure. Such a liquid crystal dispensing apparatus is referred to as a pneumatic liquid crystal dispensing apparatus, and is described with reference to FIG. 7.

Figure 7:
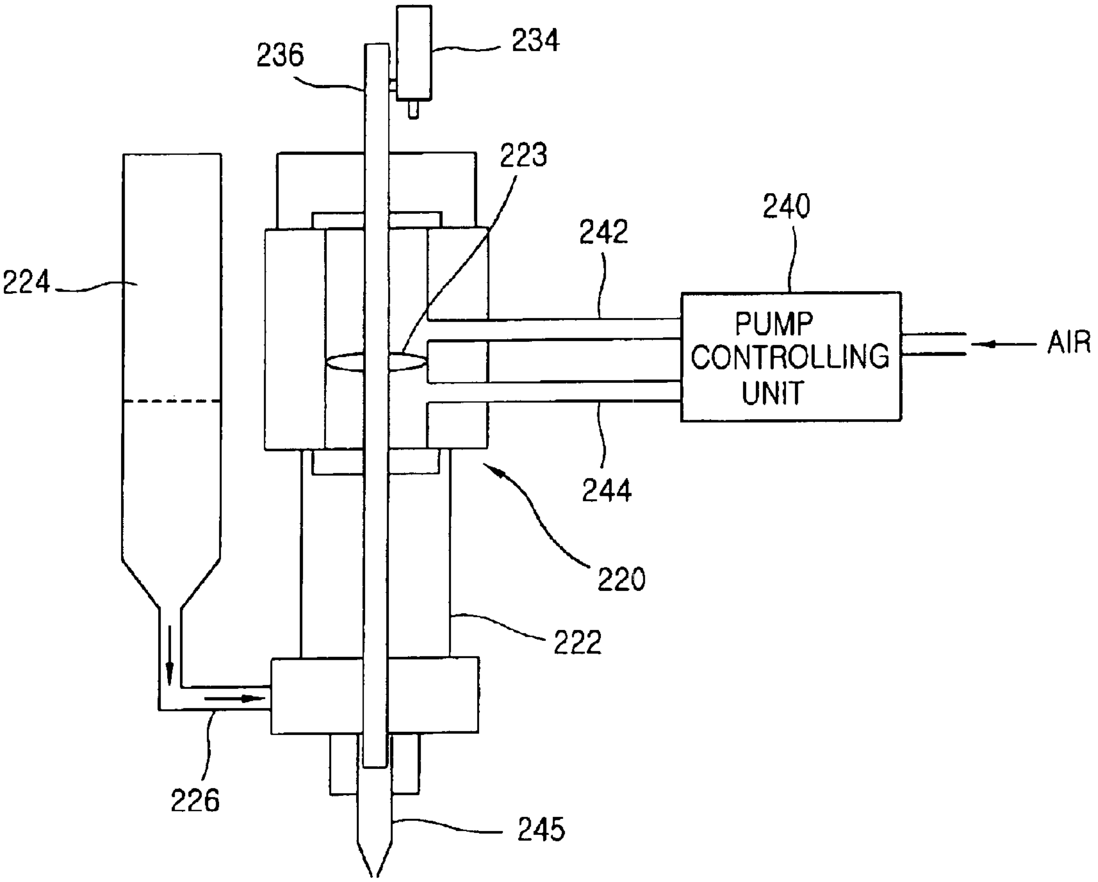
FIG. 7 is illustrates a conventional pneumatic liquid crystal dispensing apparatus.

As shown in FIG. 7, the pneumatic liquid crystal dispensing apparatus 220 includes a cylindrical case 222 having a center axis that is directed vertically. A movable, long, thin bar shaped piston 236 is supported along the center axis. An end portion of the piston 236 is installed so as to enable movement into a nozzle 245 that is disposed on a lower end of the case 222. On a side wall around the nozzle 245 is an opening that enables liquid crystal in the liquid crystal container 224 to flow into the nozzle 245 through a supply tube 226. The liquid crystal from the nozzle 245 is dropped according to the motion of the nozzle 245. However, the surface tension of the liquid crystal prevents discharge until a force is supplied.

Two air inducing holes 242 and 244 are formed in a side wall of an air room in the case 222. A separating wall 223 divides the interior of the air room into two parts defined by the piston 236. The separating wall is installed to move the interior wall between the air inducing holes 242 and 244 using the piston 236. Therefore, the separating wall is moved downward when compressed air is induced from the air inducing hole 242 into the air room, and moved upward by compressed air induced from the air inducing hole 244 into the air room. The piston 236 is moves up-and-down direction a predetermined amount.

The air inducing holes 242 and 244 are connected to a pump controlling portion 240 that removes air from and provides air to the air inducing holes 242 and 244.

When operated, a predetermined amount of liquid crystal is dropped from the pneumatic liquid crystal dispensing apparatus. The dropping amount (volume) can be controlled by controlling the movement of the piston 236 using a micro gauge 234 that is fixed on the piston 236 and which protrudes above the case 222.

In the conventional pneumatic liquid crystal dispensing apparatus 220 the liquid crystal drop size is controlled by air pressure. However, it takes a significant amount of time to supply the air room with the air. Additionally, the movement of the separating wall 223 by the air pressure is particularly rapid. Therefore, the liquid crystal drop size is not rapidly controllable. Also, the amount of air provided to the air room through the pump should be calculated exactly. However, it is impossible to provide the air room with the exact amount of air that is required. Moreover, motion of the piston 236 can be changed by frictional forces between the separating wall 223 and the piston 236 even if the exact amount of air is provided. Therefore, it is difficult to accurately move the piston 236 in a controlled fashion.

To solve the problems of the conventional pneumatic liquid crystal dispensing apparatus, the principles of the present invention provide for a new electronic liquid crystal dispensing apparatus that will be described in detail with reference to the accompanying Figures.

Figure 8A:
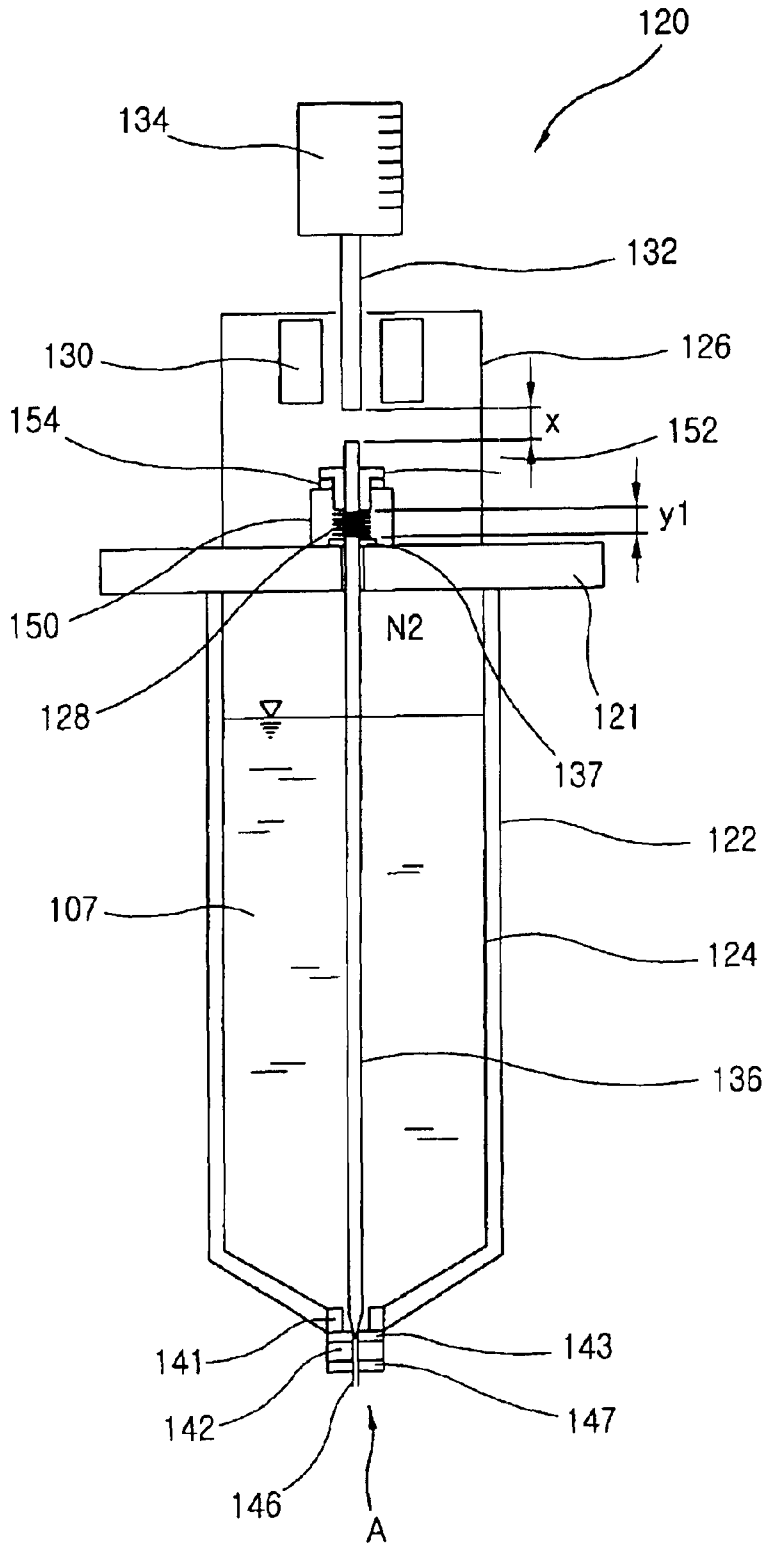
FIG. 8A illustrates a first view of a liquid crystal dispensing apparatus according to the present invention.
Figure 8B:
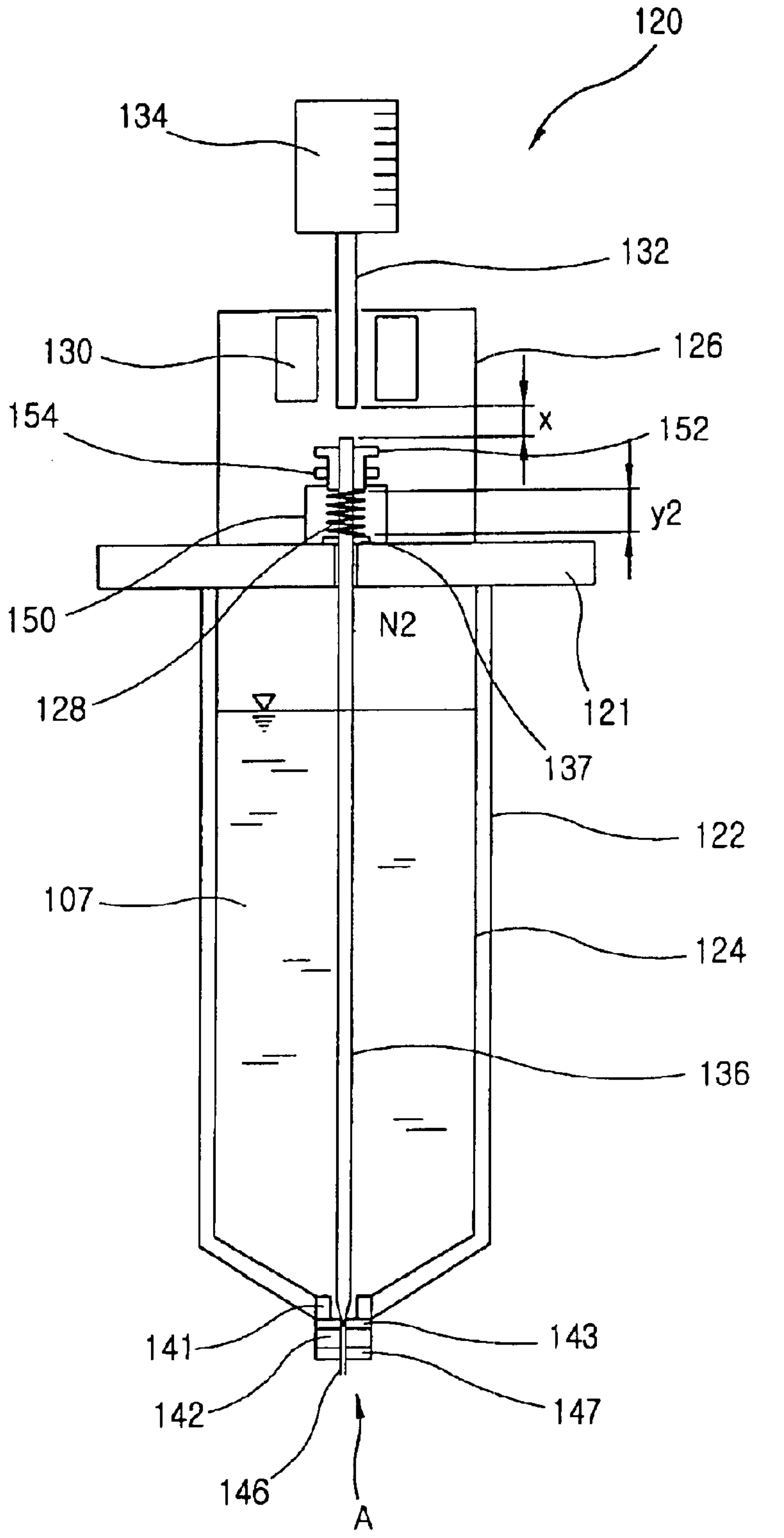
FIG. 8B illustrates a second view of a liquid crystal dispensing apparatus according to the present invention.
Figure 9:
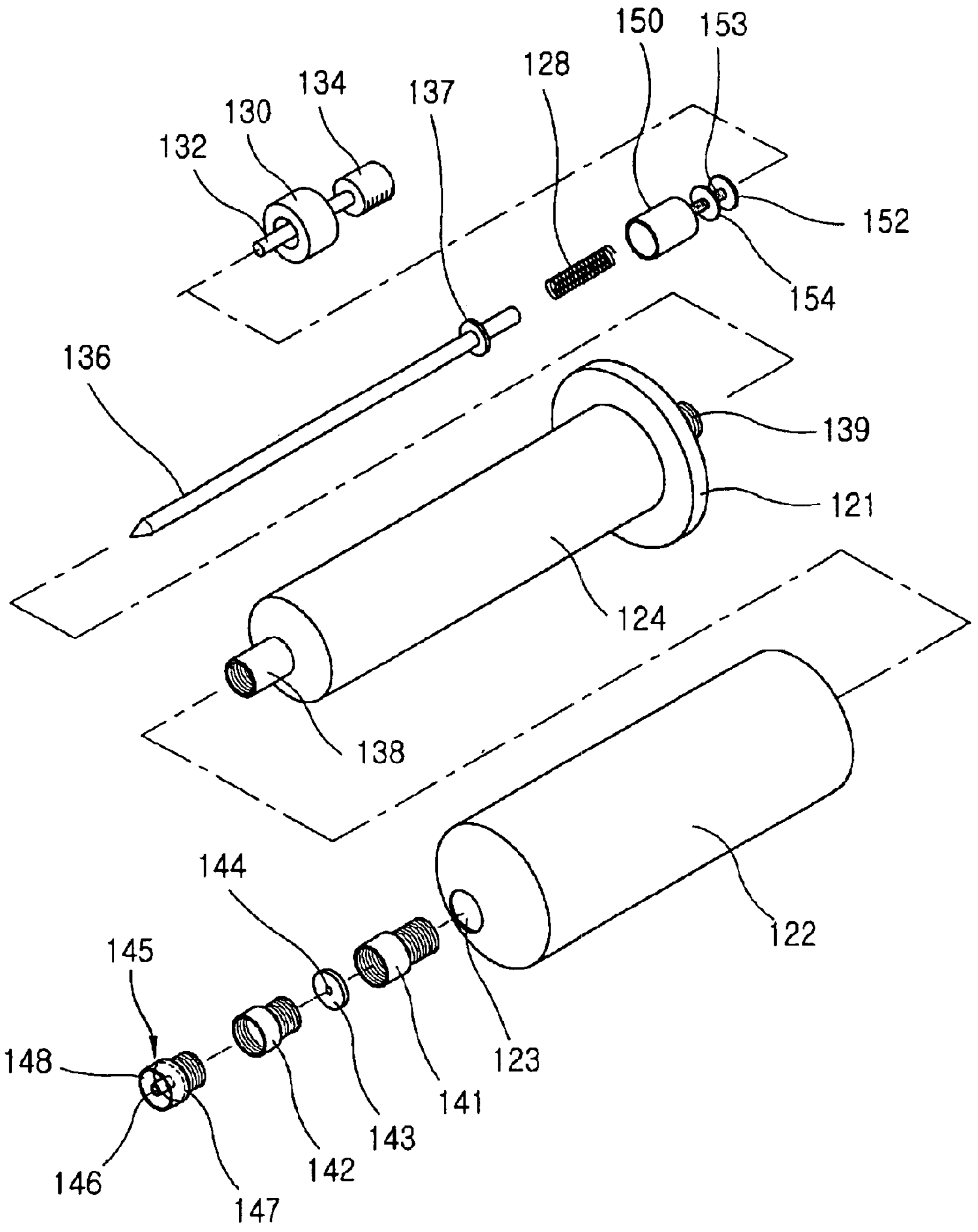
FIG. 9 is an exploded perspective view of a liquid crystal dispensing apparatus according to the present invention.

FIGS. 8A and 8B illustrate a liquid crystal dispensing apparatus 120 according to the principles of the present invention, while FIG. 9 is an exploded perspective view of the liquid crystal dispensing apparatus 120. As shown in FIGS. 8A and 8B, liquid crystal 107 is contained in a cylindrical liquid crystal container 124. The liquid crystal container 124 is beneficially comprised of polyethylene. In addition, a stainless steel case 122 houses the liquid crystal container 124. Polyethylene has superior plasticity, it can be formed into a desired shape easily, and polyethylene does not react with the liquid crystal 107. However, polyethylene can be easily distorted. Such distortion could cause liquid crystal to be dropped improperly. Therefore, the liquid crystal container 124 is housed in the case 122, which, being made from stainless steel, suffers little distortion.

The liquid crystal container 124 could be made from a metal such as stainless steel. The structure of the liquid crystal dispensing apparatus would be simplified and the fabrication cost could be reduced. But, Teflon should then be applied inside the liquid crystal dispensing apparatus to prevent the liquid crystal from contaminating chemical reactions with the metal.

Although not shown in the Figures, a gas supply tube on an upper part of the liquid crystal container 124 is connected to a gas supply. The gas, beneficially nitrogen, fills the volume of the liquid crystal container 124 that is not filled with liquid crystal. Gas pressure assists liquid crystal dropping.

Referring now to FIG. 9, an opening 123 is formed at the lower end of the case 122, while a protrusion 138 is formed at the lower end of the liquid crystal container 124. The protrusion 138 is inserted through the opening 123 to enable coupling of the liquid crystal container 124 to the case 122. The protrusion 138 is mated to a first connecting portion 141. As shown in FIG. 9, threads are formed on the protrusion 138, while receiving threads are formed on one side of the first connecting portion 141. This enables the protrusion 138 and the first connecting portion 141 to be threaded together.

Additionally, the first connecting portion 141 and a second connecting portion 142 are threaded so as to enable matting of the first connecting portion 141 and the second connecting portion 142. A needle sheet 143 is located between the first connecting portion 141 and the second connecting portion 142. The needle sheet 143 is inserted into the first connecting portion 141 and is held in place when the first connecting portion 141 and the second connecting portion 142 are mated. The needle sheet 143 includes a discharging hole 144 that enables liquid crystal 107 in the liquid crystal container 124 to be discharged into the second connecting portion 142.

Also, a nozzle 145 is connected to the second connecting portion 142. The nozzle 145 is for dropping liquid crystal 107 in small amounts. The nozzle 145 comprises a supporting portion 147, comprised of a bolt that connects to the second connecting portion 142, and a nozzle opening 146 that protrudes from the supporting portion 147 to form dispensed liquid crystal into a drop.

A discharging tube from the discharging hole 144 to the nozzle opening 146 is formed by the foregoing components. Generally, the nozzle opening 146 of the nozzle 145 has a very small diameter and protrudes from the supporting portion 147.

Referring now to FIGS. 8A, 8B, and 9, a needle 136 is inserted into the liquid crystal container 124 through a supporting portion 121. One end of the needle 136 contacts the needle sheet 143. That end of the needle 136 is conically shaped and fits into the discharging hole 144 to enable closing of the discharging hole 144.

A spring 128 is installed on the other end of the needle 136, which extends into an upper case 126. The spring 128 is received in a cylindrical spring receiving case 150. A spring fixing portion 137 prevents the spring from sliding down the needle 136. As shown in FIG. 9, the supporting portion 121 includes a protruding threaded member 139. The spring receiving case 150 includes mating threads that enable mating of the threaded member 139 to the spring receiving case 150, thus fixing the spring receiving case 150 on the supporting portion 121.

The spring receiving case 150 further includes threads that mate with an elongated threaded bolt 153 of a tension controlling unit 152 that controls the tension of the spring 128. The bolt 153 is threaded onto the spring receiving case 150. An end portion of the bolt 153 contacts the spring 128. Therefore, the spring is fixed between the spring fixing portion 137 and the bolt 153.

In FIGS. 8A, 8B, and 9 the reference numeral 154 represents a fixing plate for preventing the tension controlling unit 152 from being moved. As shown in FIGS. 8A and 8B, the tension controlling unit 152 can be rotated such that the bolt 153 adjusts the length of the spring, and thus the spring's tension. When the tension is correct, the fixing plate can lock the spring length to produce a desired tension.

As described above, since the spring 128 is installed and fixed between the spring fixing portion 137 and the tension controlling unit 152, the tension of the spring 128 can be set by the length of the tension controlling unit 152 inserted into the spring receiving case 150. For example, when the tension controlling unit 152 is controlled to make the length of the bolt 153 inserted into the spring receiving case 150 short (by make the length of the bolt outside the spring receiving case 150 long), the length of the spring 128 is lengthened and the tension is lowered, reference FIG. 8B. In addition, when the length of the bolt 153 outside the spring receiving case 150 becomes short, the tension is increased, reference FIG. 8A. The tension of the spring 128 can be controlled to a desired level by controlling the tension controlling unit 152.

A bar magnetic 132 above a gap controlling unit 134 is disposed above the needle 136. The bar magnetic 132 is made of magnetic material such as a ferromagnetic material or a soft magnetic material. A solenoid 130 is installed around the bar magnetic. The solenoid 130 is connected to an electric power supply that selectively supplies electric power to the solenoid 130. This selectively produces a bar magnetic on the magnetic bar 132.

The bar magnetic 132 is separated by a predetermined interval (x) from the needle 136. When the electric power is applied to the solenoid 130 the resulting magnetic force causes the needle 136 to contact the bar magnetic 132. When the electric power is stopped, the needle 136 returns to its stable position by the elasticity of the spring 128. Vertical movement of the needle causes the discharging hole 144 to selectively open and close.

The end of the needle 136 and the needle sheet 143 may be damaged by the shock of repeated contact. Therefore, it is desirable that the end of the needle 136 and the needle sheet 143 be made from a material that resists shock. For example, a hard metal such as stainless steel is suitable.

Figure 10:
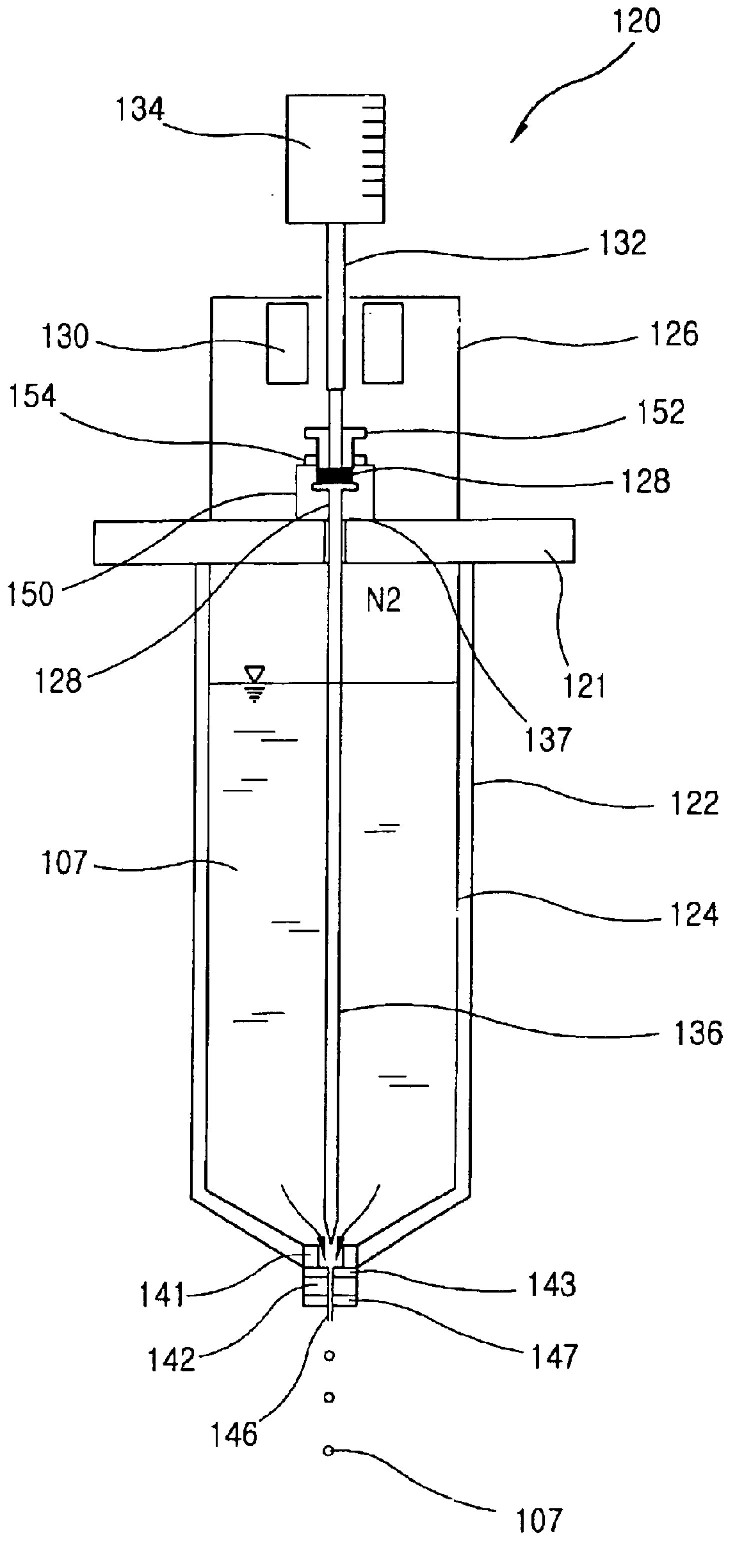
FIG. 10 illustrates the liquid crystal apparatus of FIG. 9 dispensing liquid crystal.

FIG. 10 illustrates the liquid crystal dispensing apparatus 120 when the discharging hole 144 is open. As shown, the electric power applied to the solenoid 130 causes the needle 136 to move upward. The nitrogen gas in the liquid crystal container 124 forces liquid crystal through the nozzle 145. The drop size depends on the time that discharging hole 144 is open and on the gas pressure. The opening time is determined by the distance (x) between the needle 136 and the magnetic bar 132, the magnetic force of the bar magnetic 132 and the solenoid 130, and the tension of the spring 128.

The magnetic force can be controlled by the number of windings of the solenoid 130, field of the magnetic bar 132, or by the applied electric power. The distance x can be controlled by the gap controlling unit 134.

The tension of the spring 128 is controlled by the tension controlling unit 152. FIG. 8A shows the length of the spring 128 as y1 (having a high tension) while FIG. 8B shows the length of the spring y2 (having a low tension). The position Y can be adjusted by the tension controlling unit 152. Consequently, the returning speed of the needle 136 can be adjusted by the tension controlling unit 152, the opening time of the discharging hole 144 can be adjusted by the tension controlling unit 152, and the amount of liquid crystal dropped can be adjusted by the tension controlling unit 152. Thus, the liquid crystal drop size can be accurately controlled.

Using the tension controlling unit 152A to control the size of the liquid crystal drop has advantageous. A controller, such as a microcomputer, as well as its costs and programming, is not required. Furthermore, overall operation is simplified.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal dispensing apparatus, comprising:

a liquid crystal housing for holding liquid crystal;

a needle sheet disposed near the end of the liquid crystal housing and having an opening for discharging liquid crystal;

a movable needle;

a spring that biases the needle toward the opening so as close the opening;

a spring tensioner controlling the tension of the spring;

a needle mover for moving the needle against the spring such that the opening is open; and a nozzle adjacent the opening for dispensing liquid crystal that passes through the opening;

wherein the spring tensioner can vary the tension of the spring, and wherein the spring tension controls the volume of liquid crystal that is discharged.

2. The apparatus of claim 1, further including a coupling tube for guiding liquid crystal from the needle sheet to the nozzle.

3. The apparatus of claim 1, wherein the needle mover includes:

a solenoid for selectively producing a magnetic field in response to an applied electric power, and a bar magnet, wherein the solenoid and the bar magnet produce magnetic forces that move the needle.

4. The apparatus of claim 1, further comprising a supporting platform on the liquid crystal housing.

5. The apparatus of claim 4, wherein the spring tensioner comprises:

a receiving case that holds the spring; and a tension controller inserted into the receiving case for controlling the tension of the spring by varying the spring length.

6. A liquid crystal dispensing apparatus, comprising:

a liquid crystal housing for holding liquid crystal;

a needle sheet disposed near the end of the liquid crystal housing and having an opening for discharging liquid crystal;

a movable needle;

a spring that biases the needle toward the opening so as close the opening;

a spring tensioner controlling the tension of the spring, wherein the spring tensioner includes a receiving case that holds the spring; and a tension controller inserted into the receiving case for controlling the tension of the spring by varying the spring length;

a needle mover for moving the needle against the spring such that the opening is open; and a nozzle adjacent the opening for dispensing liquid crystal that passes through the opening;

a supporting platform on the liquid crystal housing;

wherein the spring tensioner can vary the tension of the spring and wherein the spring tension controls the volume of liquid crystal that is discharged; and wherein the receiving case is on the supporting platform.

7. The apparatus of claim 5, further including a tension unit connected between the spring and the tension controller for adjusting the spring length.

8. The apparatus of claim 1, further including a spring connector for coupling the spring to the needle.

9. The apparatus of claim 8, wherein the spring is positioned between the spring connector and the tension controller.

10. A liquid crystal dispensing apparatus comprising:

a housing;

a liquid crystal container in the housing for holding liquid crystal;

a needle sheet disposed near an end of the liquid crystal container and having an opening through which liquid crystal is discharged;

a movable needle, inserted into the liquid crystal container, for selectively contacting the opening so as to open and close the opening;

a spring in a receiving case that biases the needle toward the opening with a force that depends on the length of the spring; and a movable bar inserted into the receiving case and connected to the spring such that the length of the spring depends on the position of the movable bar;

a spring-length controller for controlling the position of the movable bar;

a solenoid coil disposed adjacent the needle for generating a magnetic force that moves the needle to open the opening; and a nozzle for ejecting liquid crystal that passes through the opening.

11. The apparatus of claim 10, further including a bar magnet bar that interacts with the solenoid coil and assists needle movement.

12. A liquid crystal dispensing apparatus, comprising:

a liquid crystal housing for holding liquid crystal;

a needle sheet disposed near the end of the liquid crystal housing and having an opening for discharging liquid crystal;

a movable needle;

a spring that biases the needle toward the opening to close it;

a spring tensioner for controlling the tension of the spring;

a needle mover for moving the needle against the spring tension such that the opening is open; and a nozzle adjacent the opening for dispensing liquid crystal that passes through the opening;

wherein the spring tensioner can vary the tension of the spring, and wherein the spring tension controls the volume of liquid crystal that is discharged.

13. The apparatus of claim 12, wherein the needle mover includes a solenoid for selectively producing a magnetic field in response to an applied electric power, and a bar magnet, wherein the solenoid and the bar magnet produce magnetic forces that move the needle.

14. A liquid crystal dispensing apparatus, comprising:

a liquid crystal housing for holding liquid crystal;

a needle sheet disposed near the end of the liquid crystal housing and having an opening for discharging liquid crystal;

a movable needle;

a spring that biases the needle toward the opening so as close the opening;

a needle mover for moving the needle against the spring such that the opening is open;

a nozzle adjacent the opening for dispensing liquid crystal that passes through the opening;

a spring tensioner controlling the tension of the spring, wherein the spring tensioner includes:

a supporting platform on the liquid crystal housing;

a receiving case on the supporting platform that holds the spring; and a tension controller inserted into the receiving case for controlling the tension of the spring by varying the spring length;

wherein the spring tensioner can vary the tension of the spring and wherein the spring tension controls the volume of liquid crystal that is discharged.

15. The apparatus of claim 14, wherein the needle extends through the supporting platform.

16. The apparatus of claim 14, wherein the spring tensioner further includes a tensioning unit, connected between the spring and the tension controller, for adjusting the spring length.

17. The apparatus of claim 12, further including a spring coupler for coupling the spring to the needle.

18. The apparatus of claim 17, wherein the spring is positioned between the spring coupler and the tension controller.

19. A liquid crystal dispensing apparatus, comprising:

a liquid crystal housing for holding liquid crystal;

a needle sheet disposed near the end of the liquid crystal housing and having an opening for discharging liquid crystal;

a movable needle;

a spring that biases the needle toward the opening to close it;

a spring tensioner for controlling the tension of the spring;

a needle mover for moving the needle against the spring such that the opening is open; and a nozzle adjacent the opening for dispensing liquid crystal that passes through the opening;

wherein the spring tensioner can vary the tension of the spring, and wherein the spring tension controls the time that the opening is open.

20. The apparatus of claim 19, wherein the needle mover includes a solenoid for selectively producing a magnetic field in response to an applied electric power, and a bar magnetic, wherein the solenoid and the bar magnet produce magnetic forces that move the needle.

21. A liquid crystal dispensing apparatus, comprising:

a liquid crystal housing for holding liquid crystal;

a needle sheet disposed near the end of the liquid crystal housing and having an opening for discharging liquid crystal;

a movable needle;

a spring that biases the needle toward the opening to close it;

a needle mover for moving the needle against the spring such that the opening is open; and a nozzle adjacent the opening for dispensing liquid crystal that passes through the opening;

a sprint tensioner for controlling the tension of the spring; wherein the spring tensioner includes:

a supporting platform on the liquid crystal housing;

a receiving case on the supporting platform that holds the spring; and a tension controller inserted into the receiving case for controlling the tension of the spring by varying the spring length;

wherein the spring tensioner can vary the tension of the spring and wherein the spring tension controls the time that the opening is open.

22. The apparatus of claim 21, wherein the needle extends through the supporting platform.

23. The apparatus of claim 21, wherein the spring tensioner further includes a tensioning unit, connected between the spring and the tension controller, for adjusting the spring length.

24. The apparatus of claim 19, further including a spring coupler for coupling the spring to the needle.

25. The apparatus of claim 24, wherein the spring is positioned between the spring coupler and the tension controller.

* * * * *